US010628927B2

(12) United States Patent
Zelenka (10) Patent No.: US 10,628,927 B2
(45) Date of Patent: Apr. 21, 2020

(54) RAPID IMAGE CORRECTION METHOD FOR A SIMPLIFIED ADAPTIVE OPTICAL SYSTEM

(71) Applicant: Christian-Albrechts-Universitaet zu Kiel, Kiel (DE)

(72) Inventor: Claudius Zelenka, Moenkeberg (DE)

(73) Assignee: Christian-Albrechts-Universitaet zu Kiel, Kiel (DE)

( * ) Notice: Subject to any disclaimer, the term of this patent is extended or adjusted under 35 U.S.C. 154(b) by 0 days.

(21) Appl. No.: 16/309,231

(22) PCT Filed: Jun. 13, 2017

(86) PCT No.: PCT/DE2017/100497
§ 371 (c)(1),
(2) Date: Dec. 12, 2018

(87) PCT Pub. No.: WO2018/006897
PCT Pub. Date: Jan. 11, 2018

(65) Prior Publication Data
US 2019/0188834 A1 Jun. 20, 2019

(30) Foreign Application Priority Data
Jul. 6, 2016 (EP) .................................... 16178151

(51) Int. Cl.
*G06T 5/00* (2006.01)
*G06T 5/10* (2006.01)
(Continued)

(52) U.S. Cl.
CPC ................ *G06T 5/006* (2013.01); *G01J 9/00* (2013.01); *G06T 5/003* (2013.01); *G06T 5/10* (2013.01);
(Continued)

(58) Field of Classification Search
CPC .......... G06T 5/006; G06T 5/10; G06T 5/003; G06T 2207/20056; G06T 2207/10056; H04N 5/3572; G01J 9/00; G01J 2009/002
See application file for complete search history.

(56) References Cited

U.S. PATENT DOCUMENTS 9,423,600 B2 * 8/2016 Matsumoto ........ G02B 21/0068

OTHER PUBLICATIONS

Laurent, M. Mugnier et al: "Regularized multiframe myopic deconvolution from wavefront sensing", Optical Sensing II, vol. 3763, Oct. 5, 1999 (Oct. 5, 1999), XP055309228, 1000 20th St. Bellingham WA 98225-6705 USA, ISSN: 0277-786X, DOI: 10.1117/12.363607, ISBN: 978-1-62841-971-9, abstract, section 3.1.
(Continued)

*Primary Examiner* — Twyler L Haskins
*Assistant Examiner* — Angel L Garces-Rivera
(74) *Attorney, Agent, or Firm* — Patent Central LLC; Stephan A. Pendorf (57) ABSTRACT

A computer-aided image correction method for images with at least spatially partially coherent light requiring only a phase-modulated image as input. It does not reconstruct the phases on the image sensor, but rather assumes that they should ideally all be the same. With this assumption, the invention formulates a constraint and an update rule. The result of the iteration is an amplitude distribution of the lightwave field, which could have been measured directly if aberrations in the form of wavefront distortions had not contributed to the actual image acquisition. Further, a device that can, using the image correction method, be used as an adaptive optic for imaging instruments.

9 Claims, 7 Drawing Sheets

(51) Int. Cl.
*G01J 9/00* (2006.01)
*H04N 5/357* (2011.01)

(52) U.S. Cl.
CPC ...... *H04N 5/3572* (2013.01); *G01J 2009/002* (2013.01); *G06T 2207/10056* (2013.01); *G06T 2207/20056* (2013.01)

(56) References Cited

OTHER PUBLICATIONS

Gerchberg, R. W. et al: "A Practical Algorithm for the Determination of Phase From Image and Diffraction Plane Pictures", Optik, Wissenschaftlicher Verlag GMBH, DE, vol. 35, No. 2, Jan. 1, 1972 (Jan. 1, 1972), pp. 237-246, XP000615059, ISSN: 0030-4026, cited in the application, abstract, figure 1, section "The Algorithm".
International Search Report dated Aug. 11, 2017, in International Application No. PCT/DE2017/100497.

* cited by examiner

RAPID IMAGE CORRECTION METHOD FOR A SIMPLIFIED ADAPTIVE OPTICAL SYSTEM

The invention relates to a computer-aided image correction method for images with at least spatially partially coherent light. The invention further relates to a device that, using the image correction method, can be used as an adaptive optic for imaging instruments.

The state of the art knows the technical task of imaging the light reflected or scattered by objects on electronic image sensors with light intensity measuring pixels, and to store the image thus acquired as an electronically readable file with measured values, for example color or gray values. In this case, optical aberrations may occur which result from the lenses used for imaging, from refractive index fluctuations in the light-traversed media and/or from erroneous arrangements of the optical components to each other, e.g. defocus.

With the exception of diffraction effects which are unavoidable due to the large lens or apertures, the optical aberrations can basically be corrected, for example by specially ground compensating lenses as aspheres or applanates, or by aspherical mirrors. Fixed installed compensation lenses or rigid compensation mirrors do not adapt to aberrations varying over time, so that adaptive optics are used for high-precision telescopes and microscopes.

From the document "Regularized multi frame myopic deconvolution from wave front sensing," Optical Sensing II, Vol. 3763, Oct. 5, 1999, a computer-aided image correction method for images having predetermined optical aberrations is known, wherein at least spatially partially coherent light is guided to an electronic two-dimensional image sensor with light-sensitive pixels and thereby identifying the predetermined optical aberrations with the predetermined deformation of the wavefront of the incident light wave field relative to a plane wave and providing a deformation representing phase modulation as a function of the pixel coordinates of the image sensor, followed by the detection of an image on the image sensor.

For electronically captured and stored images, today post-processing processes are also available that can calculate a corrected image from a faulty image, as described in P. A. Jansson, Editor, Deconvolution of images and spectra, 2nd ed. Dover ed. Mineola, N.Y.: Dover Publications, 2012. However, these are designed for images with incoherent light that do not produce interference stripes or interference rings. Images of coherent and incoherent light are described mathematically differently, namely for coherent light as a linear functional of the light wave amplitude and for incoherent light as a linear functional of the light intensity. The above image correction methods therefore fail in the case of at least spatially partially coherent light.

Both high-resolution telescopes for observing the starry sky and precision microscopes with built-in LED light sources capture at least partially spatially coherent light and usually provide this to an electronic camera. The optical aberrations—except those errors that are due to the finiteness of the aperture—cause a deformation or distortion of the wavefront ("wavefront distortion") of the light wave field incident on the image sensor, which are predominantly—but not only—caused by fluctuations of the medium in the object space, e.g. atmosphere or immersion liquid.

Figure 1:
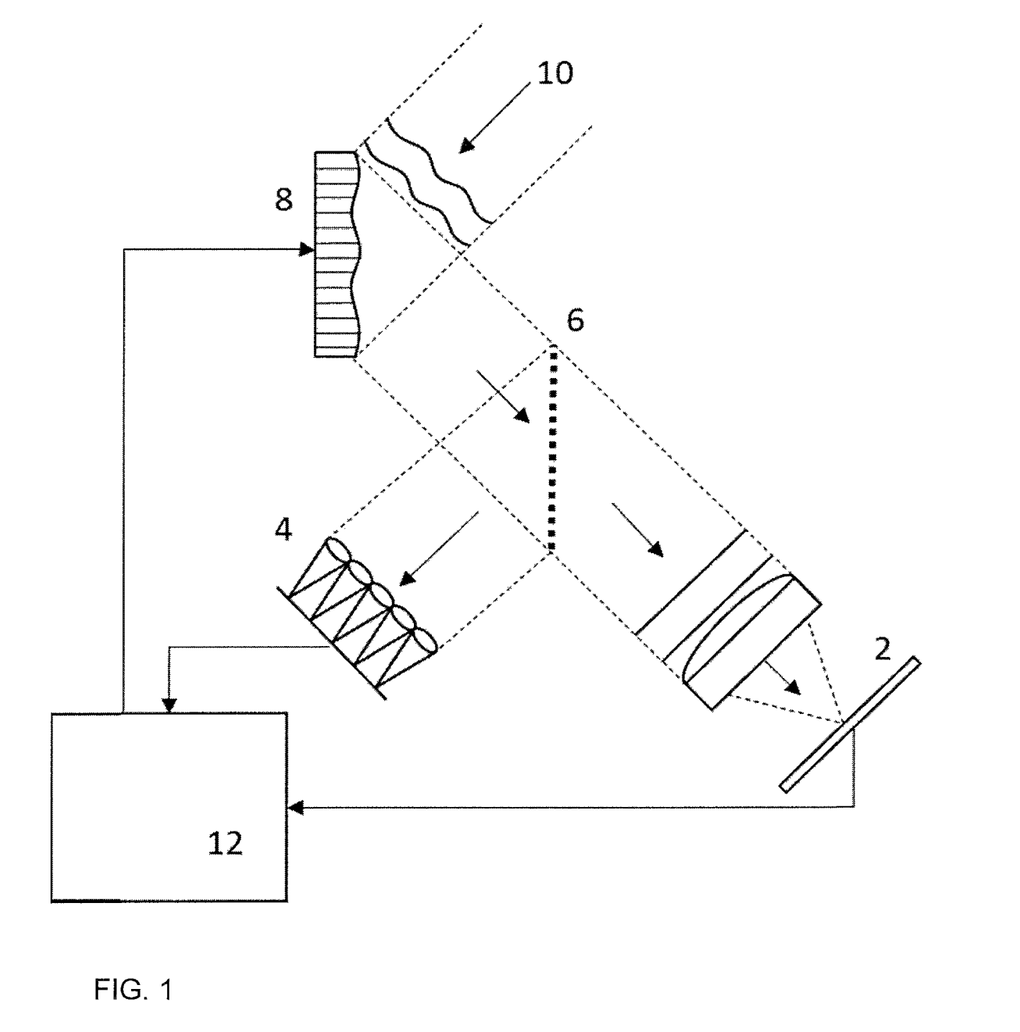
FIG. 1 a sketch of an adaptive optics according to the state of the art.

An exemplary construction of an adaptive optics according to the state of the art is shown in FIG. 1.

An adaptive optic conventionally comprises a sensor (4) for measuring the deformation of the wavefront, which may be designed, for example, as a Shack-Hartmann sensor. Commercially available wavefront sensors (4) are commonly designed to capture, display, and output for further use the aberrations in numerical form, for example, as an array of path length differences between the individual local areas of the wavefront. The wavefront sensor (4) can also be designed to interpolate the measurement data and/or to calculate a mathematical representation of the aberrations, for example a Zernike polynomial evolution, and to output the development coefficients.

An adaptive optical system according to the state of the art further comprises an optical compensating element (8). For this purpose, for example, electronically controllable spatial light modulators or deformable mirrors come into consideration. Furthermore, a control device (12) for controlling individual elements of the compensating element (8) is provided, wherein the control device (12) may be, for example, a conventional personal computer.

The mode of action of the adaptive optics consists essentially in initially guiding the incident light (usually largely collimated) onto the compensating element (8) where it is transmitted or reflected, then dividing the light with a beam splitter (6) and directing a respective partial beam to the wavefront sensor (4) and to be focused on the image sensor (2). At the same time, the measured data of the wavefront sensor (4) are used to control the compensating element (8) in such a way that the deformation of the wavefront is compensated as completely as possible. In particular, for example, a deformable mirror can be provided as compensating element (8) which has an array of electronically controllable adjusting elements, e.g. piezo elements, in order to deform the mirror surface. The path length differences of the local regions of the incident wavefront (10) measured with the wavefront sensor (4) can be directly compensated for by a control for adjusting individual control elements, so that the reflected wavefront is again approximately planar.

With successful compensation of the wavefront distortion, focusing on the image sensor (2) produces a sharp image.

Compensating elements (8) in adaptive optics can be driven and reconfigured in real time as the optical aberrations change. This is especially the case with refractive index fluctuations in the medium, which are unpredictable and can only be detected by measurements with wavefront sensors (4).

However, one would like to forego the expensive and not always reliable compensating elements (8) and instead aim for a purely numerical correction of the measured color or gray values on the image sensor (2) on the basis of the wavefront distortion measured at the same time during the image acquisition.

The invention therefore has as its object to provide a computer-aided image correction method and an apparatus for use as adaptive optics with the aid of the fast image correction method.

The object is achieved by an image correction method with the steps according to claim 1. The subclaims indicate advantageous embodiments and are also directed to an apparatus for use as adaptive optics.

As already mentioned, the invention regards the measurable wavefront distortion of incoming, inherently planar light waves as a measure of optical aberrations regardless of location and cause of their formation. The invention also claims only to be able to correct such aberrations that can be detected as a measurable wavefront distortion. It should be noted, however, that in addition to the media fluctuations that lead to refractive index fluctuations, the imaging properties of the lens systems, e.g., aberrations, astigmatism, coma, and the like, can lead to wavefront distortions. Since the correction method described below can not distinguish between the causes of the distortions, such errors are automatically corrected. However, this means that the optical quality of the imaging lenses does not matter so much when using the invention; low-cost optical components may be employed.

The image correction method according to the invention is surprisingly simple and will also be explained with reference to the following figures. There is shown in:

FIG. 2 real shots of a test object for microscopes a) focused, b) defocused and c) numerically reconstructed;

FIG. 3 a synthetic image distortion, where a) is the original and b) is the distorted image and c) is the wavefront deformation used for the distortion;

FIG. 4 the numerical reconstruction of the picture from FIG. 3b) after a) 10 iterations and b) 500 iterations;

The distortion of an incoming, inherently planar wavefront of the lightwave field is nothing more than the total of the path length differences between the different local areas of the wavefront. Consequently, the phase position of the light wave is modulated before focusing along a coordinate plane perpendicular to the optical axis. The location-dependent phase-modulated wave function is then focused on the image sensor, so that in the plane of the image sensor, a light wave field is present and is detected, which has a mixing of different phase-modulated—and thus partially misaligned—light components and their interference on the pixels of the image sensor.

The phase modulation before focusing $P(x, y)=\exp(ik \Delta(x, y))$ can be derived from the path length differences $\Delta(x, y)$ of the wavefront distortion with $k=2\pi/\lambda$ and $\lambda$ obtained as the wavelength of the monochromatic light here. A common wavefront sensor typically outputs $\Delta$ in units of wavelength and is often capable of interpolation to the pixel coordinates of the image sensor.

Taking advantage of the known fact that the focus corresponds to a Fourier transformation of the lightwave field, one can use the phase-modulated lightwave field $E_M$ with an undisturbed light wave field $E_0$, that has no wavefront distortions, described as follows:

$$E_M = F(E_0 * P). \qquad (1)$$

This means the wave function $E_0(x, y)$ is first multiplied pixel by pixel using the location-dependent phase modulation $P(x, y)$—i.e. represented in pixel coordinates of the image sensor, even if $E_0$ is not present on the image sensor—and thereafter the Fourier transform of the product occurs.

Preferably, a complex Fast Fourier Transform (FFT) algorithm in two dimensions may be used for this, and we will briefly note here $F(\ldots)$ and $F^{-1}(\ldots)$ as operators for the Fourier transformation and the inverse Fourier transformation, respectively. The execution of both operators in succession corresponds to the identity, if necessary, up to a constant offset value.

You can expect an image correction, if you instead of $E_M$ a light wave field $E_K$ would have been present on the image sensor, as $$E_K = F(E_0) \qquad (2)$$

could describe. But because the complex fields of light waves $E_M$ cannot be measured, you can get an approximate calculation of $E_K$ only numerically iteratively. From (1) and (2) arise $$E_K = F(P^{-1} * F^{-1}(E_M)) \qquad (3)$$

$$E_M = F(P * F^{-1}(E_K)) \qquad (4)$$

with $P^{-1}(x, y)=\exp(-ik\Delta(x, y))$ as conjugated phase modulation.

Therefore, according to the invention, (3) and (4) are used for setting up a numerical iteration loop. In this case, (3) describes the double Fourier transformation of the phase-modulated lightwave field $E_M$ under removal of the phase modulation. In contrast, (4) describes the double Fourier transform of the lightwave field $E_K$ by adding the phase modulation.

First, the intensity distribution $I(x, y)$ is detected on the image sensor as an image, and from this is calculated a first phase modulated light wave field $$E_M^{(1)}(x,y)=\sqrt{I(x,y)}e^{i\varphi_0(x,y)} \qquad (5)$$

on the pixel coordinates x, y with arbitrary, i.e., for example, random or uniform initial values of the phase $\varphi_0(x, y)$. With $\eta$ as a natural number then a corrected, i.e. from the predetermined phase modulation adjusted, light wave field is approximately determined as $$E_K^{(n)} = F(P^{-1} * F^{-1}(E_M^{(n)})) \qquad (6)$$

which should satisfy the additional condition that the same phase exists on all pixels of the image sensor. Therein $$E_K^{(n)}(x, y) = \sqrt{|E_K^{(n)}(x, y)|^2}\, e^{i\varphi^{(n)}(x,y)} \qquad (7)$$

and the phases $\varphi^{(n)}(x, y)$ are all set to any constant value, for example and preferably zero. Expressed in other words, the pointers of the complex values of $E_K^{(n)}$ are rotated on a predetermined axis, preferably the real axis. So you get preferably the update $$E_K^{(n+1)}(x,y) = \sqrt{|E_K^{(n)}(x,y)|^2}. \qquad (8)$$

The distribution thus obtained contains only positive real values. The practical testing of the algorithm has shown that the determination of an exclusively positive amplitude distribution can not visibly influence the result and actually leads to greater convergence.

Furthermore, this results in a second phase-modulated lightwave field $$E_M^{(n+1)} = F(P * F^{-1}(E_K^{(n+1)})) \qquad (9)$$

calculated according to (4). This in turn must have the captured image as an intensity distribution, so it should be valid:

$$I(x,y)=|E_M^{(n+1)}(x,y)|^2=|E_M^{(1)}(x,y)|^2 \qquad (10)$$

Therefore, the second phase-modulated lightwave field becomes $$E_M^{(n+1)}(x, y) = \sqrt{|E_M^{(n+1)}(x, y)|^2}\, e^{i\delta^{(n+1)}(x,y)} \qquad (11)$$

replaced by in another update step $$E_M^{(n+2)}(x, y) = \sqrt{|E_M^{(1)}(x, y)|^2}\, e^{i\delta^{(n+1)}(x,y)} \qquad (12)$$

while maintaining the phases $\delta^{(n+1)}(x, y)$ which resulted from the calculation of (9). With the result of (12) one can go to the next iteration loop beginning with (6) and iterate until convergence.

Convergence is achieved when the phases $\varphi^{(n)}(x, y)$ as a result of (7) show a predetermined minimization of the pixel-by-pixel variance, i.e. if they are already substantially a constant independent from (x, y), for example zero.

Alternatively, convergence is achieved when the pixel-by-pixel difference in the amplitudes of the second and first phase modulated lightwave fields satisfies a predetermined minimization criterion, for example $$\Sigma_{x,y} |\sqrt{|E_M^{(n+1)}(x,y)|^2} - \sqrt{|E_M^{(n)}(x,y)|^2}| < \varepsilon \qquad (13)$$

with a predetermined real numerical value $\varepsilon > 0$. The summation runs over all pixels. Here the output $E_M^{(n+1)}$ from (9) is to be compared with the input $E_m^{(n)}$ in (6).

Both convergence criteria are suitable for achieving the same result of the iteration. One can also require that both must be fulfilled simultaneously.

When convergence is reached, the last calculated corrected lightwave field $E_K$ is the actual result of the image correction process. Its absolute square as intensity distribution over the pixel coordinates represents an improved, in particular sharper image than the image originally captured with the image sensor. The aberrations associated with wavefront distortions are then largely eliminated.

The computer-aided image correction method according to the invention for images with predetermined aberrations, wherein at least spatially partially coherent light is guided onto an electronic, two-dimensional image sensor with light-sensitive pixels, comprises the following steps:

a. identifying the predetermined optical aberrations with the predetermined deformation of the wavefront of the incident lightwave field with respect to an even wave and providing a phase modulation representing the deformation as a function of the pixel coordinates of the image sensor;

b. capturing an image on the image sensor;

c. calculating a first phase-modulated lightwave field from the image by calculating the amplitude from the detected intensities and initializing the phase components with $\phi_0$, wherein the phase $\phi_0$ has random or uniform initial values, d. calculating a corrected lightwave field by Fourier transforming the first phase modulated lightwave field, removing the phase modulation and inverse Fourier transformation;

e. assuming an even wavefront for the corrected lightwave field by equalizing the phase on all pixel co-ordinates;

f. calculating a second phase modulated lightwave field by Fourier transforming the corrected lightwave field, adding the phase modulation and inverse Fourier transformation;

g. replacing the amplitudes of the second phase modulated lightwave field with the amplitudes of the first phase modulated lightwave field while maintaining the calculated phases of the second phase modulated lightwave field at all pixel coordinates;

h. accepting the result of step g as the first phase modulated lightwave field and iteratively repeating the steps d to h until a convergence criterion is met;

i. calculating a corrected image from the corrected lightwave field when fulfilling the convergence criterion by calculating the intensity from the amplitude by squaring.

The method according to the invention reminds the person skilled in the art of a Gerchberg-Saxton algorithm ("A Practical Algorithm for the Determination of Phase from Image and Diffraction Plane Pictures", Optics, Vol. 35, No. 2, (1972) pp. 237-246) for phase retrieval in a coherent light image. However, such algorithms for phase recovery usually require a plurality of differently phase-modulated, possibly differently defocused, images, which are used within an iteration loop to fulfill constraints.

The invention, on the other hand, requires only a phase-modulated image as input, and it does not reconstruct the phases on the image sensor, but rather assumes that they should ideally all be the same. With this assumption, the invention formulates a constraint—step e—and by way of example the update rule (8). The result of the iteration is an amplitude distribution of the lightwave field, which could have been measured directly if aberrations in the form of wavefront distortions had not contributed to the actual image acquisition.

As one embodiment, the application of the image correction method to the digital imaging of a conventional microscopic test object is demonstrated. For this purpose, the flat test object is irradiated with light from a medium wavelength 650 nm light source, and the transmitted light is imaged onto an image sensor with a digital camera instead of the eyepiece. A series of images is recorded for different distances of the test object with increments of 50 microns. The sharpest picture of the test object is shown in FIG. 2a), while FIG. 2b) shows a strongly defocused image which arises when the test object is shifted by 1950 micrometers along the optical axis.

The effective aberration in FIG. 2b) is thus predetermined and quantified here as a defocus and may be described in the formula $$P(x, y) = \exp\left(ik\frac{x^2 + y^2}{2r}\right). \qquad (14)$$

Therein r is the radius of curvature of the wavefront, which can either be measured directly or calculated by means of an imaging simulation program by modeling the measurement setup, including the defocus.

With the predetermined phase modulation from (14) and the phase modulated image from FIG. 2b) as inputs, the image correction method according to the invention can be carried out and as a result delivers the image in FIG. 2c). It should be noted that it may be advantageous to first apply edge killing algorithms to the input image prior to image correction to reduce artifacts in the FFT operations.

Figure 2:
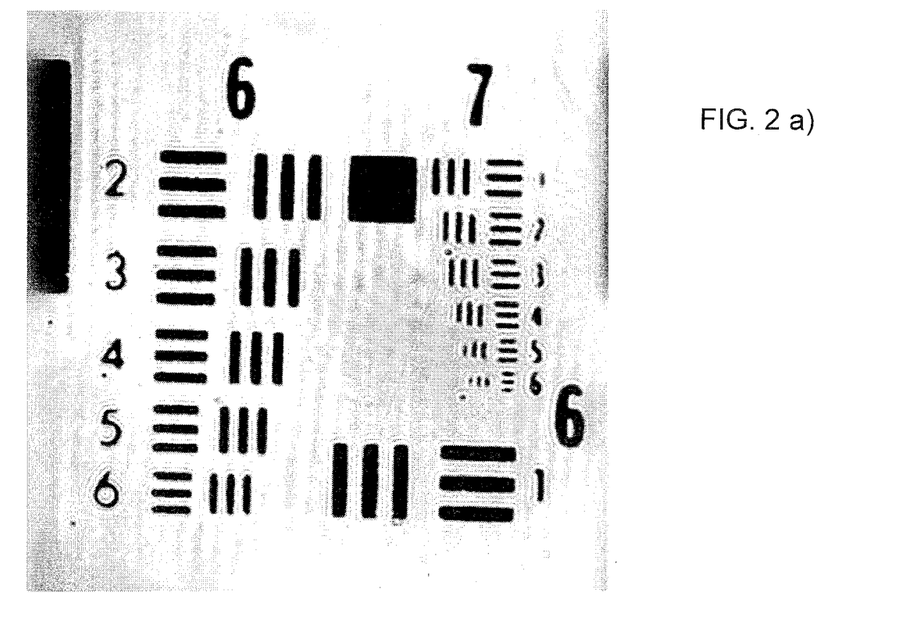

The image correction compared to the images in FIG. 2 validates the assumption that ordinary light emitting diodes generate light with sufficient spatial coherence for performing the image correction process presented herein.

Figure 3:
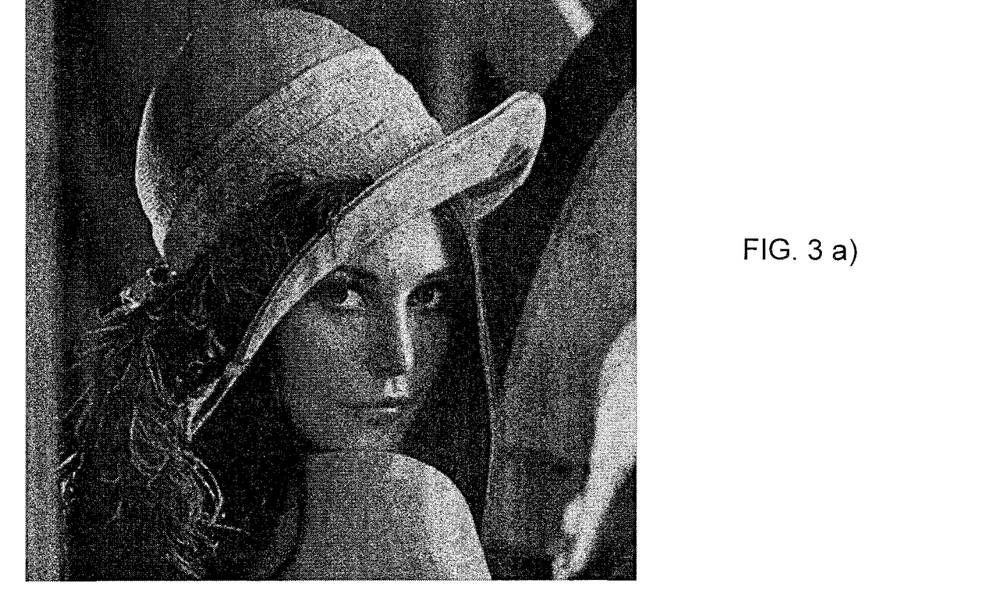
Figure 4:
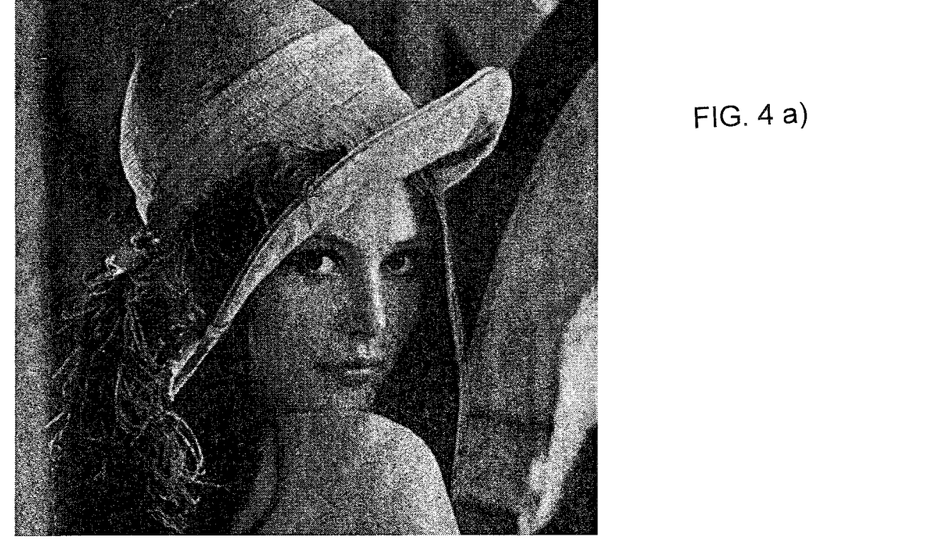

A second embodiment is intended to show that the image correction can also be applied to images which have been produced with more complicated aberrations than a defocus. For this purpose, an original image in FIG. 3a) combined with a predetermined wavefront distortion in a simulated image. The result is the calculated image in FIG. 3b). The wavefront distortion used here is a combination of the aberrations defocus, astigmatism and coma, and in FIG. 3c) as path length differences $\Delta(x, y)$ shown graphically. With the phase modulation $P(x, y)=\exp(ik\Delta(x, y))$ and the picture from FIG. 3b) as inputs, the image correction method according to the invention after passing through only 10 iteration loops leads to the corrected image in FIG. 4a), and after about 500 iterations it achieves an almost perfect correction in FIG. 4b). A single iteration loop for a 512×512 pixel image on a 4 GHz PC takes about 14 milliseconds in the current implementation.

The relatively rapid convergence to a significantly improved image, certainly sufficient for some purposes, with a computational requirement on the order of 1 second or less, suggests the consideration of real-time image correction applications. In addition, in a real-time application, it is not necessary to constantly initialize the iteration loop with a random array, which speeds up the convergence tremendously.

It is considered to be particularly advantageous that applications can be considered in which the optical aberrations are subject to a change over time, i.e. in particular those which must use a wavefront sensor.

In a preliminary consideration, it is examined whether the data measurable with a commercially available Shack-Hartmann sensor provides sufficient information for the application of the method. Based on the data sheet of such a sensor, with 19×13 lenslets, a specified measurement accuracy of $\lambda/50$ and a specified dynamic range of at least $50\lambda$ at the wavelength $\lambda=633$ nanometer, different wavefront deformations are simulated as measured data sets with Gaussian noise and used for image correction. It turns out that a good restoration of the image can be achieved. Even with significantly reduced measurement accuracy, the results are still acceptable. The inventive method is also applicable to the use of commercial wavefront sensors.

Since a wavefront sensor allows the instantaneous measurement of wavefront deformation, it is a preferred embodiment of the invention to repeat the prediction of optical aberrations and the provision of the phase modulation at regular time intervals.

A further preferred embodiment of the invention is seen in that a plurality of images is detected in succession on the image sensor, wherein iterating continues between two detection times until convergence.

As a combination of the aforementioned embodiments, it is advantageous that a temporal sequence of images is iteratively corrected, with the predetermining of the optical aberrations for the correction of individual images occurring in time with the sequence. For this, it is preferable to predetermine the optical aberrations by measuring the wavefront distortion of the incident lightwave field in a predetermined time frame of capturing the image. It is to be understood that the time environment is to be predetermined in such a way that a useful relationship between the time of image acquisition and the time of wavefront measurement can at least be assumed.

Figure 5:
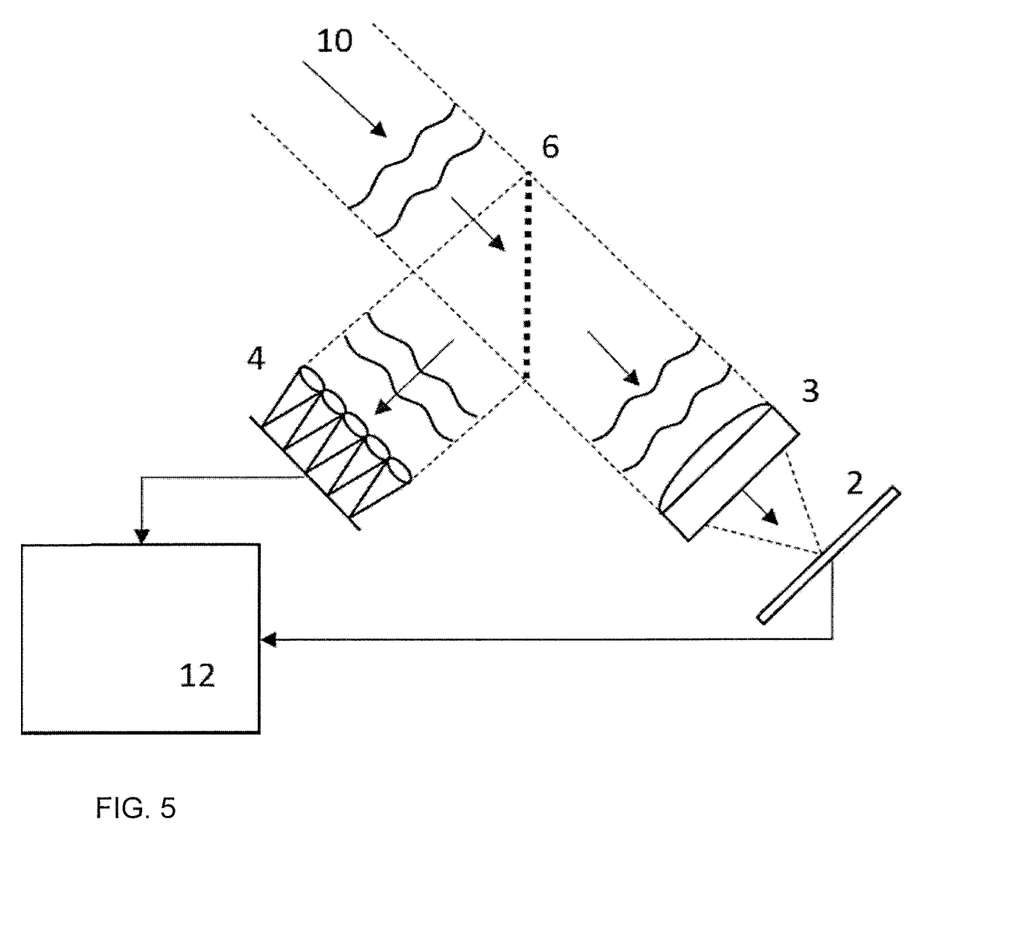
FIG. 5 a sketch of a simplified adaptive optics, wherein the computing unit uses the image correction method.

A device for use as an adaptive optic is shown schematically in FIG. 5. The device comprises at least one wavefront sensor (4) and a computing unit (12) which is designed to accept and process the measurement data of an electronic image sensor (2) and the measurement data of the wavefront sensor (4) and to perform with them the image correction method presented here, wherein measurement data are detected within a predetermined time interval to each other and the data acquisition is repeated at regular intervals. The apparatus may further include a beam splitter (6) which splits the incident light (10) and guides a respective partial beam to the image sensor (2) and the wavefront sensor (4). The device may further comprise an imaging optic (3) and the image sensor (2).

The image correction method according to the invention can be implemented as software in a conventional personal computer. In particular, it is also possible to provide a machine-readable storage medium which has read-only stored instructions executable by a computer unit for carrying out the image correction method presented here in one of its embodiments. All other mentioned components are also commercially available.

LIST OF REFERENCE NUMBERS

2 image sensor
4 sensor
6 beamsplitter
8 optical compensation element
10 light
12 control device

The invention claimed is:
1. A computer-assisted image correction method for images with predetermined optical aberrations, wherein at least spatially partially coherent light is guided onto an electronic, two-dimensional image sensor with light-sensitive pixels, comprising the steps:
   a) identifying the predetermined optical aberrations with the predetermined deformation of the wavefront of the incident light wave field with respect to an even wave and providing a phase modulation representing the deformation as a function of the pixel coordinates of the image sensor;
   b) capturing an image on the image sensor;
   characterized by the following steps:
   c) calculating a first phase-modulated lightwave field from the image by calculating the amplitude from the detected intensities and initializing the phase components with $\varphi_0$, where the phase $\varphi_0$ has random or unitary initial values;
   d) calculating a corrected lightwave field by Fourier transforming the first phase modulated lightwave field, removing the phase modulation and inverse Fourier transform;
   e) assuming an even wavefront for the corrected lightwave field by equalizing the phase on all pixel coordinates;
   f) calculating a second phase modulated lightwave field by Fourier transforming the corrected lightwave field, adding the phase modulation and inverse Fourier transformation;
   g) replacing the amplitudes of the second phase modulated lightwave field with the amplitudes of the first phase modulated lightwave field while maintaining the calculated phases of the second phase modulated lightwave field at all pixel coordinates;
   h) accepting the result of step g as the first phase modulated lightwave field and iteratively repeating the steps d to h until a convergence criterion is met;
   i) calculating a corrected image from the corrected lightwave field when fulfilling the convergence criterion by calculating the intensity from the amplitude by squaring.

2. The method according to claim 1, wherein the predetermining of the optical aberrations occurs by measuring the wavefront distortion of the incident lightwave field in a predetermined time frame of capturing the image.

3. The method according to claim 1, wherein during the iteration for the corrected lightwave field calculated in step d, the minimization of the pixel-by-pixel variance of the phases is used as the convergence criterion.

4. The method according to claim 1, wherein during the iteration for the second phase-modulated lightwave field calculated in step f, the minimization of the pixel-by-pixel difference of the amplitudes from the first phase-modulated lightwave field is used as the convergence criterion.

5. The method according to claim 1, wherein the predetermining of optical aberrations and the providing of the phase modulation are repeated at regular intervals.

6. The method according to claim 1, wherein a plurality of images are detected in temporal succession on the image sensor, and wherein iteration continues between two detection times until convergence.

7. A method according to claim 5, wherein a temporal sequence of images is iteratively corrected, and wherein the predetermining of the optical aberrations for the correction of individual images keeps pace in time with the sequence.

8. A device for use as an adaptive optic, comprising at least a wavefront sensor and a computing unit which is adapted to accept and process the data of an electronic image sensor and the measurement data of a wavefront sensor and, using this, to carry out the image correction method according to claim 1, wherein the measurement data are detected within a predeteimined time interval to each other and the data acquisition is repeated at regular intervals.

9. A machine-readable storage medium comprising read-only, computer-executable instructions for performing the steps of the method of claim 1.

* * * * *